(12) United States Patent
Gross

(10) Patent No.: US 8,770,519 B2
(45) Date of Patent: Jul. 8, 2014

(54) STRUCTURAL COMPONENT OF AN AIRCRAFT OR SPACECRAFT AND A FUSELAGE COMPONENT ARRANGEMENT OF AN AIRCRAFT OR SPACECRAFT

(75) Inventor: Claus-Peter Gross, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 77 days.

(21) Appl. No.: 13/113,572

(22) Filed: May 23, 2011

(65) Prior Publication Data

US 2011/0284692 A1 Nov. 24, 2011

Related U.S. Application Data

(63) Continuation of application No. PCT/EP2009/065227, filed on Nov. 16, 2009.

(60) Provisional application No. 61/117,751, filed on Nov. 25, 2008.

(30) Foreign Application Priority Data

Nov. 25, 2008 (DE) .......................... 10 2008 044 049

(51) Int. Cl.
*B64C 1/06* (2006.01)

(52) U.S. Cl.
USPC ........................................ 244/131; 244/119

(58) Field of Classification Search
CPC .............. B64C 1/00; B64C 1/06; B64C 1/40; B64C 1/069
USPC ................................................ 244/119, 131
See application file for complete search history.

(56) References Cited

U.S. PATENT DOCUMENTS

| | | | | |
|---|---|---|---|---|
| 2,819,032 A | * | 1/1958 | Detrie et al. | 244/119 |
| 2,945,653 A | * | 7/1960 | Atkin | 244/119 |
| 3,600,016 A | * | 8/1971 | Dilley | 403/389 |
| 4,892,783 A | * | 1/1990 | Brazel | 442/326 |
| 5,803,406 A | * | 9/1998 | Kolodziej et al. | 244/171.7 |
| 2003/0080251 A1 | * | 5/2003 | Anast | 244/119 |
| 2006/0060705 A1 | * | 3/2006 | Stulc et al. | 244/119 |

FOREIGN PATENT DOCUMENTS

| | | |
|---|---|---|
| DE | 10 2006 060364 A1 | 6/2008 |
| WO | WO 2010/060824 A1 | 6/2010 |

OTHER PUBLICATIONS

European Office Action for Application Serial No. EP 09 752 189.2 dated Apr. 5, 2012.
International Search Report for PCT Application No. PCT/EP2009/065227 dated Apr. 8, 2010.

* cited by examiner

*Primary Examiner* — Tien Dinh
*Assistant Examiner* — Justin Benedik
(74) *Attorney, Agent, or Firm* — Jenkins, Wilson, Taylor & Hunt, P.A.

(57) ABSTRACT

In the case of a structural component of an aircraft or spacecraft comprising a fuselage portion connection region for connecting to an associated fuselage portion and having a thermal expansion coefficient which is approximately matched to the associated fuselage portion; an inner connection region for connecting to an associated installation element and having a thermal expansion coefficient which is approximately matched to the associated installation element; and a separation region for connecting the fuselage portion connection region and the inner connection region, at least one of the regions has a high heat conduction resistance.

6 Claims, 3 Drawing Sheets

STRUCTURAL COMPONENT OF AN AIRCRAFT OR SPACECRAFT AND A FUSELAGE COMPONENT ARRANGEMENT OF AN AIRCRAFT OR SPACECRAFT

CROSS-REFERENCE TO RELATED APPLICATIONS

This application is a continuation of and claims priority to PCT International Application No. PCT/EP2009/065227 filed Nov. 16, 2009 which claims the benefit of and priority to U.S. Provisional Application No. 61/117,751, filed Nov. 25, 2008 and German Patent Application No. 10 2008 044 049.3, filed Nov. 25, 2008, the entire disclosures of which are herein incorporated by reference.

FIELD OF THE INVENTION

The invention relates to a structural component of an aircraft or spacecraft and to a fuselage component arrangement of an aircraft or spacecraft.

Although it can be applied to any desired structural components, for example formers, stringers and the like, the present invention and the problem on which it is based are explained in more detail hereinafter with reference to rail-like structural components.

Installation elements and system installations and the loads thereof in the interior of an aircraft or spacecraft and also cabin components are currently mainly introduced via individual "brackets" in the primary structure of the fuselage of an aircraft of this type. These brackets are typically fastened to formers and to the fuselage portion, which formers and fuselage portion receive the loads from the above-mentioned installations and components.

DE 10 2006 060 364 A1 describes a fuselage component arrangement comprising a skin which is made of carbon fibres having a low thermal expansion coefficient and a structural component having a high thermal expansion coefficient, a thermal stopper having low thermal conductivity being provided and the structural component being connected to the skin by means of the thermal stopper. This mechanical configuration has an insulating layer as a thermal stopper. All of the components are joined together via rivet connections. Drawbacks experienced in this case are, on the one hand, that a large number of individual parts are required and, one the other hand, that the connections require cutting machining, in part on site with the associated installation times and cleaning measures.

SUMMARY OF THE INVENTION

The object of the present invention is therefore to provide an improved structural component of an aircraft or spacecraft, in which structural component the above-mentioned drawbacks are no longer present or are considerably reduced, and which provides further advantages. A further object is to provide a fuselage component arrangement of an aircraft or spacecraft.

Accordingly, a structural component of an aircraft or spacecraft is provided which comprises a fuselage portion connection region for connecting to an associated fuselage portion and having a thermal expansion coefficient which is approximately matched to the associated fuselage portion. The structural component also comprises an inner connection region for connecting to an associated installation element and having a thermal expansion coefficient which is approximately matched to the associated installation element. A separation region is used to connect the fuselage portion connection region and the inner connection region. At least one of the portions has a high heat conduction resistance.

An idea underlying the invention is that at least one of the portions has a high heat conduction resistance, the other portions being adapted to the materials to be connected to them in such a way that their thermal expansion coefficients can be matched approximately to the thermal expansion coefficients of the materials to be connected to them.

The present invention thus has, inter alia, the advantage over the approaches mentioned at the outset that it can be applied to all materials of the components to be connected to the structural component, irrespective of the thermal expansion coefficients of said components.

The fuselage portion connection region, the separation region and the inner connection region are preferably formed in one piece as a structural component.

Using an integrated separation layer of this type in a one-piece structural component means that a large number of individual parts and complex mechanical connection measures such as drilling, deflashing, cleaning, riveting/screwing are no longer required.

In this case, it is provided that the structural component is formed as a composite component having a common matrix material. As a result, for example in the case of a fuselage portion which is also produced as a composite component, it is possible to connect the structural component to said fuselage portion in a simple manner. In this case, the fuselage portion connection region can comprise the same or similar materials for the fuselage portion composite as the fuselage portion, for example carbon fibres.

If the fuselage portion is produced from a metal, the fuselage portion composite can consist of metal foils. The inner composite of the inner connection region of the structural component is constructed in a similar manner. In this case, further measures can be taken to reinforce connection portions by means of additional layers.

In one embodiment, the separation region comprises a separation composite, having the high heat conduction resistance, and the matrix material. In this case, it is preferred for the separation composite to be formed, for example, as glass cloth, which can be configured for example in the form of prepregs which are used to produce fibre composite components.

In the preferred configuration of the structural component, it is highly advantageous that all the composites and portions are produced from the same matrix material, for example an epoxy resin. In aircraft construction, for example, laying different layers of a composite material is a standard method, it being possible to use the associated machining equipment.

All functions are integrated into the structural component according to the invention, namely a connection to a fuselage portion, an insulating layer and a carrying structure, for example a rail structure. The structural component can be produced in one piece. The omission of additional connecting elements simplifies the assembly. It can be adhesively bonded to the corresponding fuselage portion in the manner of a reinforcing element, for example a stringer. The structural component according to the invention is possible with any combination of materials, irrespective of the thermal expansion coefficient of the fuselage portion or of the installation components. The connection to the fuselage portion can be made of the same material as the material of the fuselage portion.

A fuselage component arrangement can comprise at least one structural component as described above.

In the following, the invention is described in detail on the basis of embodiments with reference to the accompanying figures of the drawings.

DESCRIPTION OF EXEMPLARY EMBODIMENTS

Figure 1:
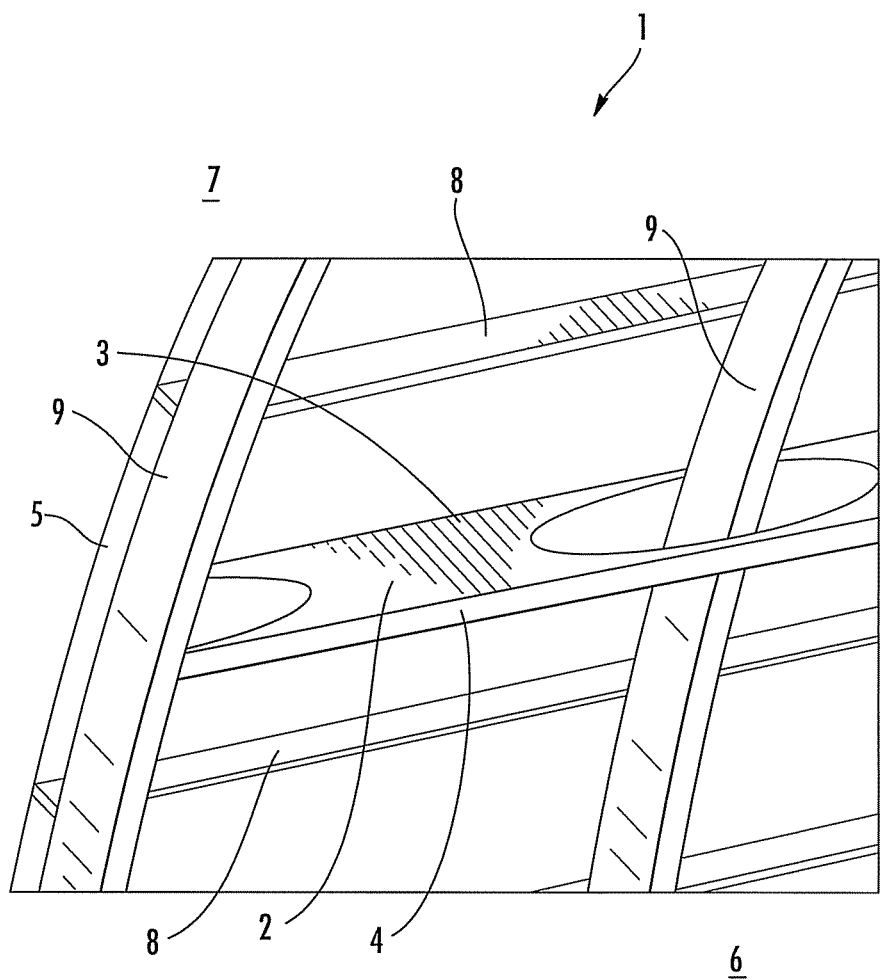
FIG. 1 is a schematic perspective view of a fuselage component arrangement according to a preferred embodiment of the present invention.

In the figures, like reference numerals denote like or functionally identical components, unless indicated otherwise.

FIG. 1 shows a schematic perspective view of a fuselage component arrangement 1 according to the invention. A fuselage portion 5 is shown in the form of a skin of an aircraft or spacecraft (not shown). The fuselage portion 5 is curved, an inner space 6, for example a cabin of an aircraft or spacecraft, being arranged towards the centre of the curvature (on the right in the figure), which inner space is separated from the skin by an outer space 7. The fuselage portion 5 is reinforced in the longitudinal direction (approximately from the left to the right in the figure) by stringers 8. Formers 9 are attached in the peripheral direction of the fuselage portion 5. A structural component 2 extends between the stringers 8, in this example parallel to the stringers 8, which structural component is provided for attaching installation elements (not shown), for example inner shells, pipework and the like, to an inner portion 4 of the structural components 2. The structural component 2 is fastened to the fuselage portion 5 by means of a fuselage portion connection 3.

During operation of the aircraft or spacecraft, the inner space 6 is usually air-conditioned and in this case is maintained at a constant temperature of approximately 20° C. The outer space can have a different temperature. For example, a hangar temperature of approximately 18° C., an external temperature on an airfield, which can be minus temperatures of, for example, −15° C. and positive temperatures of, for example, +40° C. according to time of year and location, as well as external temperatures of more than −55° C. at high flying altitudes. These temperature values should not be regarded as absolute, but should rather show that a temperature difference between the outer space 7 and the inner space 6 can vary greatly in relation to the inner temperature of the inner space 6.

Figure 2:
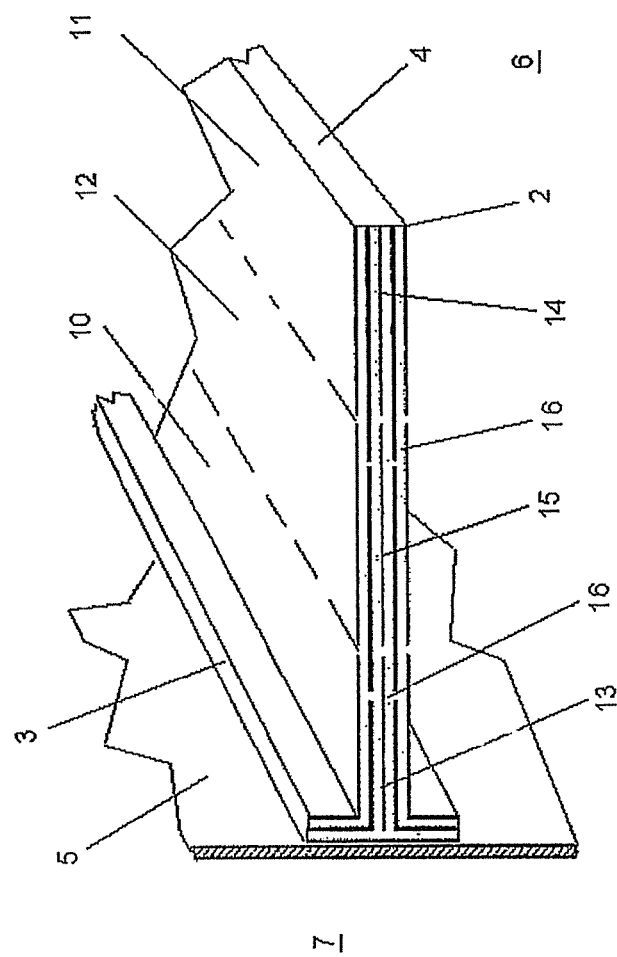
FIG. 2 is a schematic perspective sectional view of an embodiment of a structural components according to the invention comprising a fuselage portion.

FIG. 2 is a schematic perspective sectional view of an embodiment of a structural component 2 according to the invention comprising the fuselage portion 5. In this example, the fuselage portion is the skin of the aircraft or spacecraft (not shown) and is made of a composite material, for example CFRP. The structural component 2 is attached to the inner face of the fuselage portion 5 by means of the fuselage portion connection 3, in this case comprising an upper and a lower limb. In this case, these limbs extend towards the inner space 6 substantially perpendicular to the fuselage portion 5. The fuselage portion connection 3 is connected to a fuselage portion connection region 10, which transitions into a separation region 12, which is connected to an inner connection region 11. The inner connection region 11 is a component of the inner portion 4 and is provided for fastening installation elements. These can be adhesively bonded, riveted or screwed to the inner connection region 12 or connected thereto using another connection method.

The fuselage portion connection region 10 comprises a fuselage portion composite 13, which is formed differently from a separation composite 15 of the separation region 12 in terms of material, thermal expansion coefficient and heat conduction resistance. An inner composite 14 of the inner connection region 11 also differs from the separation composite 15. The fuselage connection 3, the fuselage connection portion 10, the separation region 12 and the inner connection region 11 are formed in one piece as a composite component or fibre composite component. In this case, the composites 13, 14 and 15 form the respective fibre or laminate semi-finished composite, which is surrounded on all sides and correspondingly impregnated with a matrix 16, for example an epoxy resin. The structural component 2 is produced as a fibre composite component, for example by means of prepregs. Of course, other methods are possible. In this case, the composites 13, 14, 15 are laid in a predetermined shape and form as semi-finished products, are impregnated with the matrix 16 and then cured. All forms and shapes are possible, as well as reinforcing layers and corresponding insertions of mounting portions.

Figure 3:
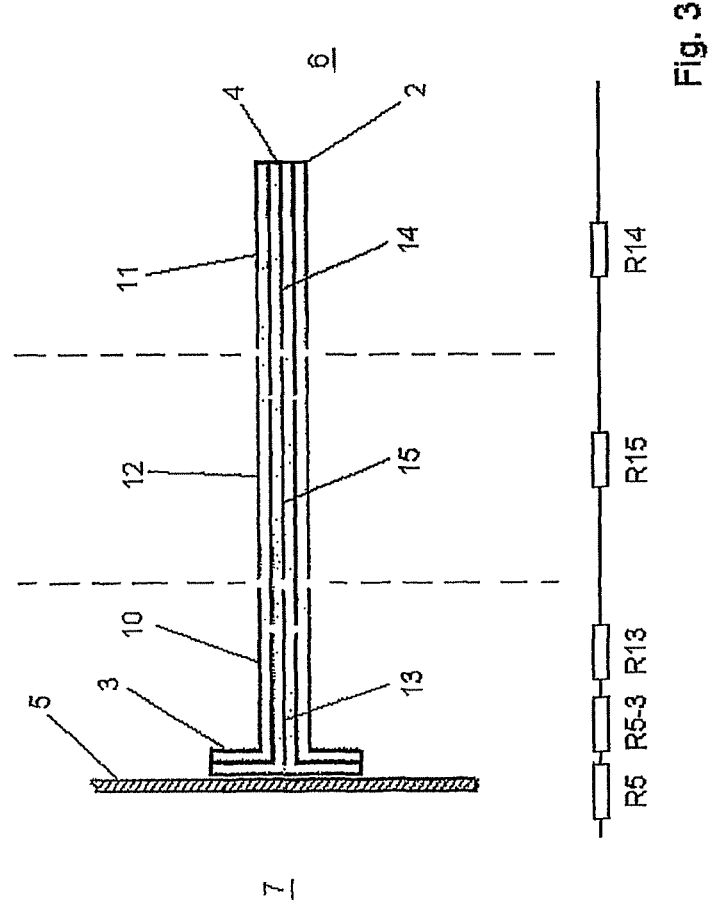
FIG. 3 is a schematic cross-sectional view of the view from FIG. 2.

The thermal transfer behaviour of the structural component 2 will be described in further detail with reference to FIG. 3. FIG. 3 is a schematic cross-sectional view according to FIG. 2.

The individual portions 10, 12, 11 are divided by vertical dashed lines. A series circuit of heat conduction resistors R5, R5-3, R13, R14, R15, each corresponding to the portions 10, 12, 11 and to the fuselage portion 5, is provided below this arrangement.

The above-mentioned differences in temperature between the inner space 6 and the outer space 7 cause heat to be transferred between the two spaces. As is known, the heat transfer takes place via radiation, conduction and convection. Only the heat transfer is considered, for which the heat conduction resistances R5, R5-3, R13, R14, R15 of the individual portions 10, 12, 11 and components in this case will be described.

In the case of a fuselage portion 5 made of a fibre composite material (for example CFRP), the fuselage portion composite 13 is also made of a corresponding fibre composite (for example CFRP). If the fuselage portion 5 is a metal, the fuselage portion composite 13 thus comprises the same or a similar metal in the form of metal threads and/or metal foils/layers. As a result, the fuselage portion 5 and the fuselage portion connection portion of the structural component 2 have thermal expansion coefficients which are approximately matched. The separation composite 15 of the separation region 12 is, for example, a glass cloth, and the inner connection region 14 is a composite which corresponds to the installation element (not shown) (for example a metallic and/or fibre composite). The thermal expansion coefficients of the inner connection composite 14 and the installation element are approximately matched. Thus no substantial stresses or only reduced stresses occur between the fuselage portion 5 and the structural component 2 and between the installation element and the structural component 2.

A transfer of heat, for example from the inner space 6 as a heat source at approximately 20° C. to the outer space as a heat sink at approximately −55° C., occurs via the structural component 2, and this is shown in the heat conduction resistor series drawn below as an equivalent diagram. The heat conduction resistance values are given only in relative terms; the specific values are to be derived from relevant tables. The inner connection region 11 has a heat conduction resistance R14, which can be relatively low in the case of a metallic composite and relatively high in the case of a fibre composite. A heat conduction resistance R15 of the separation composite 15 follows on therefrom, which, still in accordance with the glass cloth example, is very high. The separation composite thus forms a barrier against the heat flowing outwards. Heat conduction resistance R13 corresponds to the fuselage portion connection composite 13 and to the material thereof, and can thus be relatively high in the case of a CFRP material and relatively low in the case of a metal. Thermal resistance R5-13 characterises the transition between the fuselage portion connection 3 and the fuselage portion, and thermal resistance R5 corresponds to the material of the fuselage portion 5 and is relatively high in the case of a CFRP material and relatively low in the case of a metal.

It can be seen from this that irrespective of the configuration of the installation elements and of the fuselage portion 5, there is always a thermal barrier in the form of the high heat conduction resistance R15 of the separation composite 15, it being possible to eliminate condensation on the structural component 2 to a large extent.

The one-piece structural component 2 provides a component having high freedom of styling with the same or similar production methods as the other vehicle components as composite components having the advantage of an integrated high heat insulation inside the structural component and the abovementioned simultaneously integrated functions.

Although the present invention has been described herein on the basis of preferred embodiments, it is not restricted thereto, but can be combined and modified in a multiplicity of different ways.

For example, the portions 10, 12, 11 can have a different expansion in their arrangement. They can also be arranged repeatedly in succession.

In the case of a structural component 2 of an aircraft or spacecraft comprising a fuselage portion connection region 10 for connecting to an associated fuselage portion 5 and having a thermal expansion coefficient which is approximately matched to the associated fuselage portion 5; an inner connection region 11 for connecting to an associated installation element and having a thermal expansion coefficient which is approximately matched to the associated installation element; and a separation region 12 for connecting the fuselage portion connection region 10 and the inner connection region 11, at least one of the portions 10, 12, 11 has a high heat conduction resistance R13, R14, R15. A fuselage component arrangement 1 comprises at least one structural component 2 of this type.

LIST OF REFERENCE NUMERALS 1 fuselage component arrangement
2 structural component
3 fuselage portion connection
4 inner portion
5 fuselage portion
6 inner space
7 outer space
8 stringer
9 former
10 fuselage portion connection region
11 inner connection region
12 separation region
13 fuselage portion composite
14 inner composite
15 separation composite
16 matrix material
R5 heat conduction resistance of the fuselage portion
R5-3 heat conduction resistance of the transition between the fuselage portion and the fuselage portion connection
R13 heat conduction resistance of the fuselage portion composite
R14 heat conduction resistance of the inner composite
R15 heat conduction resistance of the separation composite

The invention claimed is:

1. A fuselage component arrangement of an aircraft or spacecraft, comprising a fuselage portion and a one-piece structural component which comprises:
   a fuselage portion connection region for connecting to the fuselage portion, which fuselage portion connection region has a thermal expansion coefficient which is approximately matched to the fuselage portion;
   an inner connection region for connecting to an associated installation element, which inner connection region has a thermal expansion coefficient which is approximately matched to the associated installation element; and
   a separation region for connecting the fuselage portion connection region and the inner connection region, wherein at least one of the regions has a material structure having a high heat conduction resistance,
   wherein the fuselage portion connection region, the separation region and the inner connection region are formed in one piece with one another as the structural component, wherein the one piece structural component is as at least one of a metallic composite component or a fibre composite component,
   wherein the one-piece structural component is formed as a composite component having a common matrix material that surrounds and impregnates each of the fuselage portion connection region, the separation region, and the inner connection region along substantially the entire length of the one-piece structural component, and wherein the separation region comprises a separation composite, having a high heat conduction resistance, and the matrix material, and
   wherein a fuselage portion composite of the fuselage portion connection region and an inner composite of the inner connection region differ from the separation composite in terms of material, thermal expansion coefficient, and heat conduction resistance.

2. The fuselage component arrangement according to claim 1, wherein the separation composite is formed as glass cloth.

3. The fuselage component arrangement according to claim 1, wherein the fuselage portion connection region comprises a fuselage portion composite, made of a material corresponding to the fuselage portion, and the matrix material.

4. The fuselage component arrangement according to claim 3, wherein the fuselage portion composite comprises the same composite material as the fuselage portion if the fuselage portion consists of a composite material.

5. The fuselage component arrangement according to claim 3, wherein the fuselage portion comprises a metallic material, and wherein the fuselage portion composite comprises metal foils.

6. The fuselage component arrangement according to claim 1, wherein the inner connection region comprises an inner composite, having a thermal expansion coefficient which is approximately matched to the associated installation element, and the matrix material.

* * * * *